United States Patent [19]

Curado

[11] 4,079,691
[45] Mar. 21, 1978

[54] PRESSURE INDICATORS

[75] Inventor: Leonard L. Curado, Hingham, Mass.

[73] Assignee: TRW Inc., Cleveland, Ohio

[21] Appl. No.: 747,651

[22] Filed: Dec. 6, 1976

[51] Int. Cl.$^2$ ............................................. B60C 23/04
[52] U.S. Cl. .................................. 116/34 R; 73/146.8
[58] Field of Search .................. 116/34 R, 114 PV; 73/146.8, 146.2, 146.3; 340/58; 200/61.25

[56] References Cited

U.S. PATENT DOCUMENTS

| 2,967,508 | 1/1961 | Hovorka | 116/34 R |
| 3,717,845 | 2/1973 | Winther | 340/58 |
| 3,827,393 | 8/1974 | Winther | 116/34 R |

*Primary Examiner*—S. Clement Swisher
*Assistant Examiner*—Denis E. Corr
*Attorney, Agent, or Firm*—James R. O'Connor; Martin J. O'Donnell; Thomas C. O'Konski

[57] ABSTRACT

A tire pressure indicator includes a cylindrical housing having an axial bore communicating with the interior of a pneumatic tire either through the tire valve stem or directly through the wheel rim. A valve poppet is movable within the housing between a first position in which it seals the tire by engaging a shoulder projecting inwardly in the bore and a second position in which it is spaced from the shoulder to release air from the tire. A hollow cap threadedly connects to the housing and, when so connected, compresses a spring in the housing that biases the poppet toward its second, releasing position against the air pressure in the tire biasing the poppet toward its first, sealing position. When the pressure in the tire drops to a predetermined level, the poppet moves to its second position releasing air into the cap. An indicating element normally concealed within the cap is projected from the cap by the released air to provide a visual warning of the tire pressure drop. An improved poppet and indicating element design and improved arrangement of seals prevent the leakage of air through the indicator and seal the indicator against the influx of foreign materials therein.

18 Claims, 5 Drawing Figures and consequently decreasing the reliability of the indicator.

Advantageously, the shoulder within the housing projects inwardly in the bore as well as axially toward the tire so as to form a relatively sharp, small area contact with the poppet. Additionally, an annular resilient gasket is integrally bonded to the surface of the poppet that contacts the shoulder. The small area contact shoulder and integrally bonded resilient gasket provide an effective seal against the escape of air through the indicator both when the cap is connected to the housing and removed from the housing, e.g., for inflating the tire or resetting the indicating element.

In accordance with another feature of the invention, the indicating element carries a resilient skirt seal including side walls that resiliently engage the interior walls of the cap. The side walls of the skirt seal form a cupped surface against which the air pressure released by the poppet acts to move the indicating element to its under-inflation indicating position projecting from the cap. The opposite surface of the skirt seal is shaped so that it seals the cap and prevents the influx of foreign materials therein as the indicating element moves to its projected position. Other seals strategically positioned within the indicator serve to prevent air leakage from the tire regardless of the pressure condition thereof.

In accordance with yet another feature of the invention, the end of the indicating element which projects from the cap upon the predetermined tire pressure drop is provided with a resilient sealing head which serves to seal the cap from the influx of foreign materials when the indicating element is concealed within the cap. This sealing head greatly reduces the likelihood of water, road dust, dirt, oil, grease and the like entering the cap and housing and interfering with the movable elements therein.

BRIEF DESCRIPTION OF THE DRAWING

The foregoing and other objects, features and advantages of the invention will be better understood from the following detailed description taken in conjunction with the accompanying drawing in which.

DETAILED DESCRIPTION OF ILLUSTRATIVE EMBODIMENT

Figure 1:
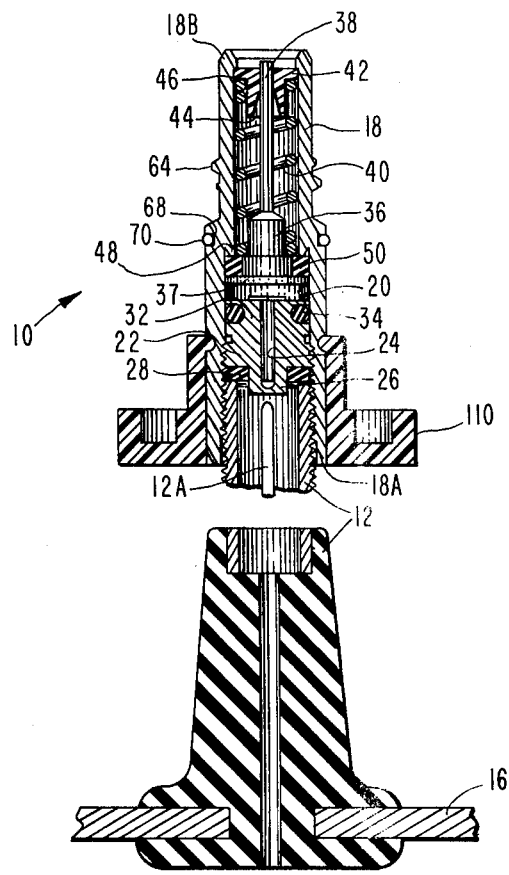
FIG. 1 is a sectional view showing a part of a pressure indicator embodying the invention connected to a valve stem of a pneumatic tire.

In FIG. 1, a pressure indicator 10 embodying the invention is shown attached to a conventional valve stem 12 extending through a rim 16 and communicating with the interior of a pneumatic tire (not shown) mounted on the rim. The stem 12 includes a core pin 12A which, when depressed in the direction of the tire, opens the valve core in the stem 12 so that air can be added to or released from the tire. The stem 12 and its mounting to a tire are conventional and thus are not shown in further detail.

Figure 1A:
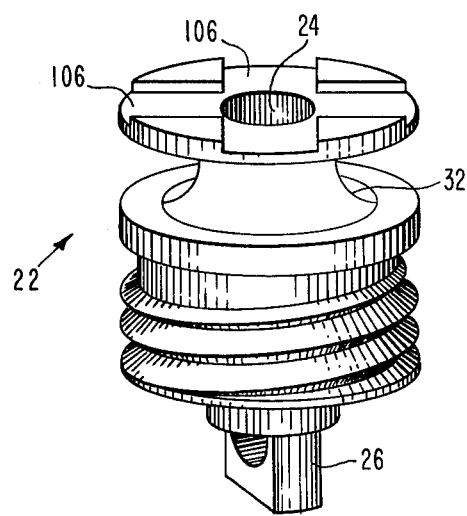
FIG. 1A is a perspective view of a valve core pin depressor included in the indicator of FIG. 1.

The indicator 10 includes a generally cylindrical housing 18 having an axial bore 20 extending completely therethrough. The housing 18 is preferably formed from a corrosion-resistant metal such as brass. The lower end 18A of the housing 18 is internally threaded and dimensioned so that it can be threaded onto the valve stem 12. An externally threaded core pin depressor 22 is threaded into the end 18A of the housing 18. The depressor 22 is shown separately in FIG. 1A of the drawing. As seen in FIG. 1A, the depressor 22 includes an axial through-bore 24 and an arch-shaped extension 26 projecting below its lower end. Thus, as the housing 18 is threaded onto the stem 12, the extension 26 engages and depresses the core pin 12A toward the tire. The housing bore 20 thus communicates with the interior of the tire through the depressor bore 24.

To prevent leakage of air between the depressor 22 and the interior walls of the housing 18, an annular, resilient (e.g., rubber) gasket 28 is positioned about the depressor extension 26 at the lower end of the depressor 22. As the housing 18 is tightened onto the stem 12, the gasket 28 is compressed between the depressor 22 and free end of the vale stem, thus effecting a seal between the two. The upper end of the depressor 22 also includes a peripheral groove 32 which is seated a resilient (e.g., rubber) O-ring seal 34. The gasket 28 and seal 34 combine to constrain air passage to or from the tire to a path through the depressor bore 24.

A valve poppet 36 is movably received within the housing bore 20 upwardly of the depressor 22. The poppet 36 includes a poppet head 37 and an integral stem 38 which projects axially in the bore 20 to the upper end 18B of the housing 18. A coil spring 40 and an annular spring thrust collar 42 are carried on the poppet stem 38. The collar 42 includes an axial through-bore 44 of diameter larger than that of the stem 38 so that the collar 42 is free to slide axially thereon and so that air can pass through the bore 44. The collar 42 is, however, constrained from movement out of the housing 18 by a shoulder 46 projecting inwardly in the bore 20 at the upper end 18B of the housing 18.

A second shoulder 48 projects inwardly in the bore 20 at an intermediate position in the housing 18 below the shoulder 46. As indicated, the spring 40 occupies the space between the collar 42 and shoulder 48. The spring 40 preferably has a relaxed, or uncompressed length that is slightly less than the axial distance between the shoulders 46 and 48. Thus, in the condition illustrated in FIG. 1, the spring 40 is uncompressed and exerting no force against the poppet head 37.

Air pressure released from the interior of the tire through the depressor bore 24 biases the poppet 36 into engagement with the shoulder 48. The poppet 36 thus normally engages the shoulder 48 and seals the tire. To insure adequate sealing, the poppet head 37 carries an annular resilient (e.g., rubber) gasket 50 which engages the shoulder 48. Preferably, the shoulder 48 extends inwardly as well as axially in the bore 20 so as to form a relatively sharp, small area contact with the gasket 50. The shoulder may, for example, have the half-toroidal configuration illustrated in FIG. 1. The gasket 50 is also preferably fixed to the poppet head 37 so that it moves with the poppet 36 within the bore 20. The gasket 50 may, for example, be adhesively or chemically bonded directly to the upper surface of the poppet head 37. The small area contact shoulder 48 and integrally bonded gasket 50 have been found to provide an effective seal against the leakage of air through the housing 18.

PRESSURE INDICATORS

BACKGROUND OF THE INVENTION

This invention relates to pressure indicators and, more particularly, to pressure indicators for pneumatic tires and the like which provide a visual warning of under-inflation.

Pneumatic tires are typically rated for use within specified pressure ranges selected to provide optimum tire wear and safety. Notwithstanding the improvements that have been made over the years in pneumatic tire materials and designs, tires still have a tendency to lose air pressure with use. The extended operation of a vehicle with one or more under-inflated tires can be costly as well as hazardous, particularly at relatively high speeds. For example, it is a known fact that under-inflated tires decrease vehicle fuel mileage and wear more quickly than properly inflated tires. Under-inflated tires can also adversely effect the maneuverability and control of the vehicle. In extreme conditions of under-inflation, tires can become so overheated as to weaken and become increasingly susceptible to sudden failure or blow-out. Since losses due to tire under-inflation can be very high in terms of cost of equipping and operating a vehicle as well as in terms of possible injury to the occupants of the vehicle, damage to cargo or to the vehicle itself, it is very desirable to provide means for indicating tire under-inflation so that it may be corrected before the vehicle is operated. It is also desirable that tire under-inflation reliably be detected by a relatively simple visual inspection of the vehicle and corrected without excessive effort.

A wide variety of pressure indicators have been previously proposed for use with pneumatic tires. Many of these indicators are designed to provide the operator of a vehicle with a visible warning as soon as a tire under-inflation condition occurs. However, in spite of the recognized utility of these indicators, none of them has experienced widespread commercial acceptance. Several reasons apparently account for this lack of acceptance.

Firstly, many of the known pressure indicators have relatively complex constructions and are thus relatively expensive. As a result, many vehicle owners and operators prefer to use conventional methods of checking tire pressure with a pressure gauge in spite of the time and inconvenience required therefor rather than equip their vehicles with the costly indicators.

Other known indicators lack sufficient reliability to justify their use in lieu of conventional pressure checking methods. In some cases, the indicators give false warnings of low tire pressure due to normal variations in tire pressure with use of the vehicle and force the vehicle operator to waste time verifying the warnings. In other cases, the indicators fail to indicate low tire pressure conditions when they occur. If the vehicle operator relies upon the indicators, the vehicle may be operated despite an under-inflated tire causing damage to the tire and other, possibly more serious, damage. These malfunctions are partly due to poor indicator designs and partly due to the wear and tear experienced by the indicators as a result of being carried by the tire and exposed to various road hazards. For example, many indicators malfunction because they fail to seal out water, road dust, dirt, oil, grease and the like which tend to interfere with the internal mechanisms thereof.

Perhaps the most significant and difficult-to-solve problem accounting for the lack of widespread use of prior pressure indicators stems from their inability to provide a reliable and effective seal for the air pressure in the tire. Because the sealing arrangements used have not been totally effective, air leaks through the indicators. With many such indicators, the leakage becomes even more rapid after they are actuated to signal a tire pressure drop. These indicators thus aggravate the very condition they are intended to eliminate.

OBJECTS OF THE INVENTION

It is, therefore, an object of this invention to provide an improved pressure indicator.

Another object of the invention is to provide an improved pressure indicator for a pneumatic tire or the like which provides a visual indication of tire under-inflation.

Another object of the invention is to provide a pressure indicator of the type described which is relatively simple and inexpensive in construction.

Another object of the invention is to provide a pressure indicator of the type described which is reliable and durable in use.

Still another object of the invention is to provde a pressure indicator of the type described which provides an improved seal against the escape of air pressure from a tire regardless of the pressure condition thereof.

SUMMARY OF THE INVENTION

Briefly, a pressure indicator embodying the invention includes a housing having an axial bore communicating with the interior of a pneumatic tire or the like. One end of the housing may be attached to a standard valve stem through which the tire is inflated or to the wheel rim supporting the tire so as to replace the standard valve stem. A valve poppet is movable within the housing between a first position in which it seals the tire by engaging a shoulder projecting inwardly in the bore and a second position in which it is spaced sufficiently from the shoulder to release air pressure from the tire. The poppet includes an integral axial stem projecting through the bore beyond the shoulder toward the free end of the housing. A suitable yielding means, such as a coil spring, is carried on the poppet stem. A hollow cap removably connects to the free end of the housing and, when so connected, compresses the spring so that it biases the poppet toward its second, releasing position against the pressure of the air in the tire biasing the poppet toward its first, sealing position in contact with the shoulder in the bore.

The spring is selected so that, when compressed by the cap, it exerts a force on the poppet sufficient to move the poppet away from the shoulder in response to a predetermined pressure drop in the tire. An indicating element normally concealed within the cap is projected from the cap by the air pressure released by the poppet to provide a visual warning of the tire pressure drop.

The free end of the housing preferably has the dimensions of a standard valve stem. Air can thus be added to or released from the tire directly through the housing when the cap is removed. Since the spring in the housing is uncompressed when the cap is removed, the poppet seals the tire even though it may be under-inflated. Additionally, the cap is arranged so that it compresses the spring to the same predetermined degree each time it is connected to the housing. This prevents the spring from becoming over-compressed, thereby weakening it The upper end 18B of the housing 18 preferably has the same cross-section as the free end of the valve stem 12. Air can thus be added to or released from the tire directly through the housing 18 using standard compressed air attachments. Communication with the interior of the tire is achieved by depressing the poppet stem 38 downwardly in the housing 18 and moving the poppet head 37 away from the shoulder 48. The poppet stem 38 thus serves the same function as the core pin 12A in the valve stem 12.

Figure 2:
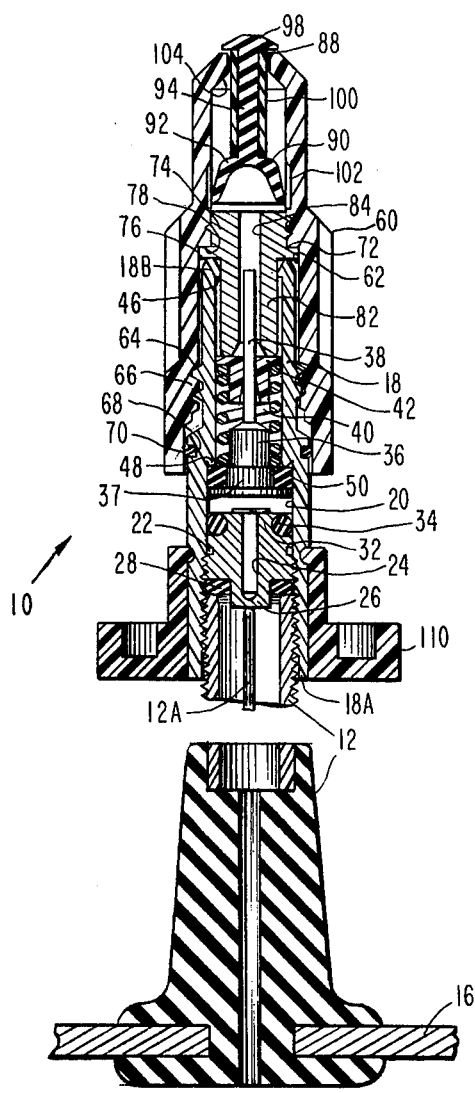
FIG. 2 is a sectional view showing the indicator of FIG. 1 with an indicating cap connected thereto.

As shown in FIG. 2, a cap removably connects to the housing 18. The cap 60, which may be formed of plastic, has a generally cylindrical shape and includes an axial bore 62 communicating with the housing bore 20. The housing 18 is provided with external threads 64 which coact with complementary threads 66 on the interior walls of the cap 60 to allow the cap to be turned onto or off the housing 18. The external surface of the housing 18 also includes a peripheral groove 68 in which is seated a resilient (e.g., rubber) O-ring seal 70. The seal 70 serves to prevent leakage of air through the space between the cap 60 and the outside of the housing 18.

An annular spring compressor 72 is fixed within the cap bore 62. The compressor 72 includes an upper portion 74 which may be threaded or barbed for securing the compressor 72 within the cap 60. The compressor 72 also includes an enlarged diameter intermediate portion 76 which flushly engages a shoulder 78 projecting inwardly in the cap bore 62 and a lower elongated portion 82 which is dimensioned to fit within the opening in the upper end 18B of the housing 18. The compressor 72 further includes an axial through-bore 84 of diameter larger than that of the poppet stem 38 so that the latter fits therein.

The cap 60 can thus be tightened onto the housing 18 until the intermediate portion 76 of the compressor 72 contacts the upper end 18B of the housing. As the cap 60 is tightened, the lower portion 82 of the compressor 72 engages the collar 42 and moves it downwardly along the poppet stem 38. As a result, the spring 40 is compressed between the collar 42 and poppet 36. Since the length of the lower compressor portion 82 is fixed, the spring 40 is compressed precisely to the same extent each time the cap 60 is tightened onto the housing 18. The spring 40 thus bias the poppet head 37 downwardly with a predetermined pressure against the air pressure in the tire biasing the poppet head upwardly into the engagement with the shoulder 48.

An opening 88 is provided in the upper end of the cap 60. An indicating element 90 is received with the cap bore 62 upwardly of the compressor 72 and movably axially therein so as to be projectible above the cap 60 through the opening 88. The lower end of the element 90 is in the form of a resilient (e.g., rubber) skirt seal 92 which has the shape of an inverted cup. The lower edge of the side walls of the seal 92 preferably has a diameter larger than that of the cap bore 62 so that the side walls resiliently engage the interior walls of the cap 60 defining the bore 62. An integral resilient rod 94 extends upwardly from the seal 92. The upper end of the rod 94 is in the form of an enlarged diameter sealing head 98 which covers the cap opening 88 when the element 90 is in the retracted position indicated in FIG. 2. The sealing head 98 prevents the influx of foreign materials such as water, road dust, and the like into the cap 60.

A sleeve 100 surrounds the rod 94. The sleeve 100 is preferably formed of a material (e.g., plastic) that is more rigid than the material forming the seal 92, rod 94 and head 98. Also, the sleeve 100 preferably has a different, more conspicuous color than the head 98 and cap 60. For example, the head 98 and cap 60 may be black in color and the sleeve 100 may be bright yellow in color so that the sleeve 100 is readily visible when it projects through the opening 88 above the cap 60. However, when the indicating element 90 occupies the retracted position indicated in FIG. 2, the sleeve 100 is completely concealed from view within the cap 60 by the head 98.

To attach the indicator 10 to the valve stem 12, the cap 60 is first removed from the housing 18 and the housing 18 is tightened onto the stem 12. The tire is then inflated through the housing 18 to its rated air pressure. The indicating element 90 is next moved (e.g., by hand pressure) to its retracted position concealed from view within the cap 60 and the cap 60 is turned onto the housing 18. As the cap 60 is tightened, the spring 40 is compressed and the poppet head 37 is thereby biased away from the shoulder 48 in opposition to the air pressure within the tire, which tends to bias the poppet head 37 into engagement with the shoulder 48.

Figure 3:
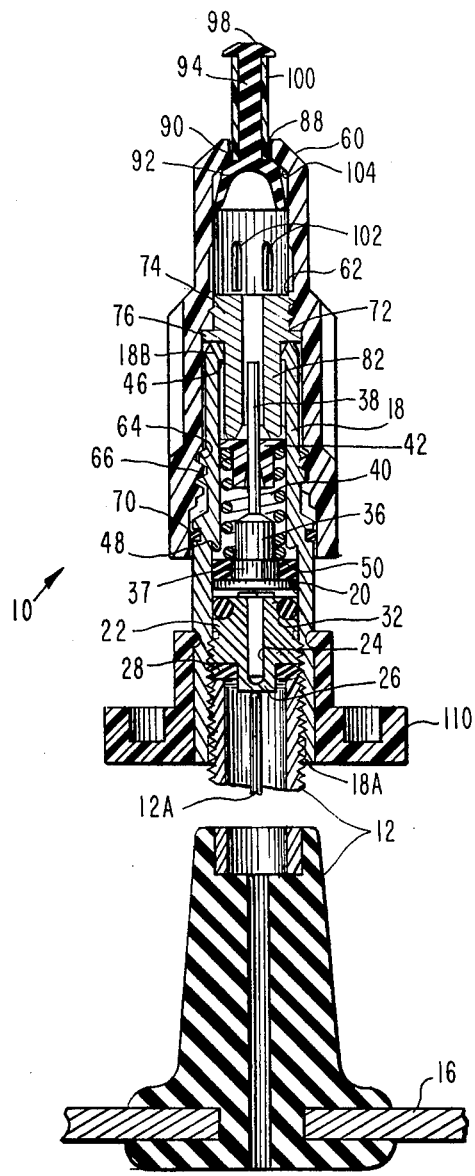
FIG. 3 is a sectional view showing the indicator of FIG. 2 in an under-inflation indicating position.

The spring constant of the spring 40 and length of the lower compressor portion 82 in the cap 60 are selected such that the spring 40 biases the poppet head 37 downwardly with a predetermined force that is less than the upward force caused by the rated pressure of the tire. The tire may, for example, be a truck tire rated for operation at an air pressure of 70 pounds per square inch (psi). The spring 40 and lower compressor portion 82 may in such a case be selected to bias the poppet head 37 with a force corresponding to a lesser pressure of, say, 60 psi. As long as the pressure in the tire remains above the predetermined pressure, the poppet head 37 sealingly engages the shoulder 48 and the indicating element 90 remains concealed from view within the cap 60. However, when the pressure in the tire drops below the predetermined pressure, due, for example, to a slow leak, a puncture, or the like, the air pressure acting against the poppet head 37 becomes insufficient to overcome the bias of the spring 40. The poppet head 37 then moves downwardly in the housing 18 away from the shoulder 48 as illustrated in FIG. 3 of the drawing. The air pressure in the tire is thus allowed to bypass the poppet head 37 and fill the cap bore 62.

The pressurized air released by the poppet 36 immediately acts against the skirt seal 92 and drives the element 90 axially in the cap bore 62 until it projects fully above the cap 60 as indicated in FIG. 3. Because of the conspicuous color of the sleeve 100, it is readily observible even upon a casual inspection of the indicator 10. The operator of the vehicle is thus warned that the air pressure in the tire has dropped below the predetermined pressure and that further inflation is required.

To re-inflate the tire to its rated pressure, the operator simply removes the cap 60 and inflates the tire through the housing 18. Preferably, the indicating element 90 is reset by depressing it into the cap 60 before the cap 60 is turned back onto the housing 18. If the element 90 is reset while the cap 60 is on the housing 18, the air occupying the cap bore 62 can become compressed as a result of the downward movement of the element 90 and thereby exert sufficient additional pressure on the poppet head 37 to move it away from the shoulder 48 even though the tire is properly inflated. This forces the element 90 to project again from the cap 60 and give a false indication of tire under-inflation.

To avoid this problem, several small, axially aligned grooves 102 may be provided in the interior walls of the cap 60 which extend a limited distance above the compressor 72. The grooves 102 allow air trapped in the cap bore 62 to by-pass the skirt seal 92 as the element 90 is reset while the cap 60 is on the housing 18. Becaue the grooves 102 extend only a limited distance above the compressor 72, the leakage therethrough is negligible when the element 90 is forced in the opposite direction out of the cap 60 to indicate tire under-inflation.

It will be noted from FIGS. 2 and 3 that the diameter of the cap bore 62 is tapered at 104 adjacent the cap opening 88. Consequently, when the indicating element 90 is in the under-inflation indication position illustrated in FIG. 3, the upper rounded surface of the skirt seal 92 is forced against the taper 104 by the air pressure released from the tire by the poppet 36. The skirt seal 92 thus advantageously seals the cap opening 88 against the influx of foreign materials therethrough even if the vehicle carrying the indicator 10 is operated for an extended period of time after the element 90 is projected from the cap 60.

It will also be noted from FIG. 1A that crossed grooves 106 are formed in the upper surface of the core pin depressor 22. The grooves 106 prevent the poppet head 37 from blocking the bore 24 in the depressor 22 when the poppet 36 moves away from the shoulder 48 into the position indicated in FIG. 3.

Additionally, a peripheral groove 108 is preferably formed in the external surface of the housing 18 in which is held a relatively large diameter annular flange plate 110. The plate 110 reduces the likelihood of the indicator 10 being drawn into the tire in the event of a flat or blow-out.

Figure 4:
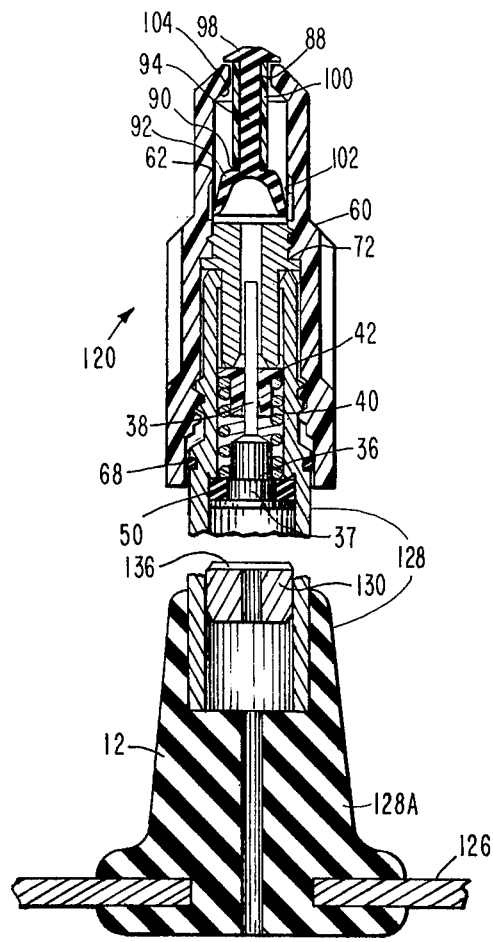
FIG. 4 is a sectional view showing a modified pressure indicator embodying the invention attached to a wheel rim supporting a pneumatic tire.

FIG. 4 of the drawing illustrates a modified indicator 120 embodying the invention which is adapted for connection directly into a wheel rim 126 supporting a tire (not shown). The indicator 120 is used in lieu of, rather than as an attachment to, a conventional valve stem.

The indicator 120 includes a housing 128, the upper portion of which is substantially identical to the housing 18 previously described. The lower end 128A of the housing 128 is, however, directly fixed within a resilient base which may be of the same type supporting the convention valve stem 12 of FIGS. 1–3 and which connects directly to the wheel rim 126 in a conventional manner. A hollow plug 132, which may be of plastic, is suitably secured within the lower end 128A of the housing 128 and serves as a stop for poppet head 37 when the poppet 36 is moved away from the shoulder 48 by the action of the spring 40. The upper end of the plug 132 may include crossed grooves 136 like the crossed grooves 106 in the core pin depressor described above. The remaining components of the indicator 120 are identical to the corresponding components of the indicator 10 previously described and are thus referenced by the same reference numerals. The strength of the spring 40 is again selected so that the indicator 90 is tripped at a predetermined pressure below the rated pressure of the tire to which the indicator is attached.

The indicator 120 operates in the same manner as the indicator 10 to provide a visual warning of tire under-inflation.

In summary, therefore, I have described pressure indicators which immediately and automatically provide a readily visible warning upon a predetermined pressure drop in a pneumatic tire or the like to which they are attached. The indicators include relatively few, simple-to-manufacture parts and are thus relatively inexpensive to produce. Each indicator is equipped with a unique poppet indicating element design and unique arrangement of seals which not only prevent the leakage of air therethrough but which also keeps the indicators clean by sealing out foreign materials in use. Each indicator is also adapted to prevent overcompression of the spring 40 that determines its warning pressure, thus insuring continued reliability after extended periods of use.

It should be understood that the indicators 10 and 120 described above are illustrative of only two specific embodiments of my invention and that numerous modifications thereof will be recognized as possible by those skilled in the art without departing from the scope of the invention as defined by the appended claims. For example, the indicator 10 can be used with an extension, between itself and the valve stem 12, to accommodate various desired lengths. Both the indicators 10 and 120 can be on vehicle tires having any of a variety of rated inflation pressures by equipping the indicators with a spring 40 of the appropriate strength. Additionally, although the indicators 10 and 120 have been described for use with pneumatic tires, they can also be used with other containers of gaseous fluids that preferably maintain specified pressure levels. It is thus the object of the appended claims to cover these and other modifications as come within the true scope of the invention.

What I claim as new and desire to secure by Letters Patent of the United States is:

1. A pressure indicator for a container of gaseous fluid under pressure comprising
    A. a housing having
        i. an axial bore communicating with the interior of the container,
        ii. a shoulder projecting inwardly at an intermediate point in said bore;
    B. a valve poppet movably received in the housing bore and including
        i. a poppet head which is biased into engagement with said shoulder by the pressure of the fluid in the container, and
        ii. an integral axial stem projecting from said poppet head beyond said shoulder in a direction away from the container;
    C. yielding means carried on said poppet stem, one end of said yielding means engaging said poppet head;
    D. a hollow cap removably connectable to the end of said housing away from the container;
    E. means disposed within said cap for compressing said yielding means when said cap is connected to said housing to bias said poppet head away from said shoulder against the pressure of the fluid in the container biasing said poppet head toward said shoulder, said compressing means including a through-opening communicating with said bore and the interior of said cap; and
    F. an indicating element slidably disposed within the cap, said element being projectable from the free end of said cap by fluid released by said poppet under the action of said yielding means upon a predetermined pressure drop within the container, said indicating element including a skirt seal having side walls resiliently engaging the interior walls of said cap and defining a cupped surface facing toward the container against which the fluid released by said poppet acts to project said element from the free end of said cap.

2. An indicator as recited in claim 1 in which said shoulder projects inwardly and axially toward the container in said bore to provide a relatively sharp, small area contact with said poppet head.

3. An indicator as recited in claim 2 in which said shoulder has a half-toroidal configuration.

4. An indicator as recited in claim 1 in which said poppet head includes a resilient gasket integrally bonded to the surface thereof that engages said shoulder.

5. An indicator as recited in claim 1 in which said shoulder comprises a first shoulder in said bore, in which said housing includes a second shoulder projecting inwardly in said bore at a point further from the container than said first shoulder, and in which said indicator further includes an annular collar slidably carried on said poppet stem and engaging the other, opposite end of said yielding means, said annular collar being constrained from movement out of said housing by said second shoulder and being movable in said housing toward said container by said compressing means to compress said yielding means when said cap is connected to said housing.

6. An indicator as recited in claim 1 in which the free end of said cap defines an opening and in which said indicating element includes a rod occupying a first, retracted position concealed within said cap when said poppet seals the fluid within the container and a second, extended position projecting into view through said cap opening when said poppet releases fluid from said container in response to the pressure drop therein.

7. An indicator as recited in claim 6 in which the end of said rod projectible through said cap opening includes a resilient sealing head for sealing said cap opening from the influx of foreign materials therethrough when said rod is in its first, retracted position.

8. An indicator as recited in claim 1 in which the interior walls of said cap include a plurality of axial grooves through which air occupying said cap bypasses said skirt seal when said indicating element is reset into said cap toward the container.

9. An indicator as recited in claim 1 in which the container comprises a pneumatic tire containing, as the fluid, air under pressure and including a valve stem communicating with the interior of the tire and in which said housing connects to the valve stem.

10. An indicator as recited in claim 8 in which the valve stem includes a core pin which normally seals the air in the tire but which when depressed into the valve stem toward the container opens the valve stem to release air from the container and in which said housing include means disposed therein for depressing the core pin and releasing air into said housing bore.

11. An indicator as recited in claim 10 in which said core pin depressing means includes an axial throughbore and means for sealing said depressing means relative to said housing to constrain the passage of air through said axial through-bore when said housing is connected to the valve stem.

12. An indicator as recited in claim 1 in which said housing further includes a flange plate projecting laterally from the external surface of said housing to prevent said indicator from being drawn into the tire upon tire failure.

13. An indicator as recited in claim 1 in which the container comprises a pneumatic tire containing, as the fluid, air under pressure and supported on a wheel rim and in which said housing connects within the wheel rim and communicates directly with the interior of the tire.

14. An indicator as recited in claim 1 in which the external surface of said housing includes a peripheral groove and an annular resilient seal seated in said groove for sealing said cap relative to said housing.

15. A pressure indicator for a pneumatic tire or the like containing air under pressure comprising:
   A. an elongated cylindrical housing having
      i. an axial bore
      ii. one end connected so as to be carried by and communicate with the interior of the tire,
      iii. an annular shoulder projecting inwardly at an intermediate point in said bore and defining a relatively sharp, small area contact surface facing toward the interior of the tire;
   B. a valve poppet movably received in the housing bore and including
      i. a poppet head,
      ii. an annular, resilient gasket integrally bonded to said poppet head and biased with said poppet head into sealing engagement with said shoulder by the air pressure in the tire;
   C. spring means carried on said poppet stem, one end of said spring means engaging said poppet head;
   D. a cap including an axial bore and removably connectable to the free end of said housing;
   E. an annular member fixed within said cap bore for entering said housing bore, engaging the other end of said spring means and compressing said spring means toward said poppet head to bias said poppet head away from said shoulder against the air pressure in the tire biasing said poppet head toward said shoulder, said poppet head thereby releasing air into said cap bore when the pressure in the tire drops below that necessary to overcome the bias of said spring means; and
   F. an indicating element slidably disposed in said cap bore and including
      i. a resilient skirt seal including side walls resiliently engaging the interior walls of said cap and forming a cupped surface facing said housing, and
      ii. an integral rod projecting from said skirt seal away from said housing, said skirt seal being driven in said cap bore by the air released by said poppet head to project said rod into view out of said cap and thereby provide a visual indication of the pressure drop in the tire.

16. A pressure indicator for a pneumatic tire or the like containing air under pressure comprising:
   A. an elongated cylindrical housing having
      i. an axial bore
      ii. one end connected so as to be carried by and communicate with the interior of the tire,
      iii. an annular shoulder projecting inwardly at an intermediate point in said bore and defining a relatively sharp, small area contact surface facing toward the interior of the tire;
   B. A valve poppet movably received in the housing bore and including
      i. a poppet head,
      ii. an annular, resilient gasket integrally bonded to said poppet head and biased with said poppet head into sealing engagement with said shoulder by the air pressure in the tire;

C. spring means carried on said poppet stem, one end of said spring means engaging said poppet head;

D. a cap including an axial bore and removably connectable to the free end of said housing;

E. an annular member fixed within said cap bore for entering said housing bore, engaging the other end of said spring means and compressing said spring means toward said poppet head to bias said poppet head away from said shoulder against the air pressure in the tire biasing said poppet head toward said shoulder, said poppet head thereby releasing air into said cap bore when the pressure in the tire drops below that necessary to overcome the bias of said spring means; and F. an indicating element slidably disposed in said cap bore, said element being projectable by the air released by said poppet head to project said element out of said cap.

17. A pressure indicator for a container of gaseous fluid under pressure comprising A. a housing having
 i. an axial bore communicating with the interior of the container,
 ii. a first shoulder projecting inwardly at an intermediate point in said bore, and
 iii. a second shoulder projecting inwardly in said bore at a point further from the container than said first shoulder;

B. a valve poppet movably received in the housing bore and including
 i. a poppet head which is biased into engagement with said shoulder by the pressure of the fluid in the container, and
 ii. an integral axial stem projecting from poppet head beyond said shoulder in a direction away from the container;

C. yielding means carried on said poppet stem, one end of said yielding means engaging said poppet head;

D. a hollow cap removably connectable to the end of said housing away from the container;

E. means disposed within said cap for compressing said yielding means when said cap is connected to said housing to bias said poppet head away from said shoulder against the pressure of the fluid in the container biasing said poppet head toward said shoulder, said compressing means including a through-opening communicating with said bore and the interior of said cap;

F. an indicating element slidably disposed within the cap, said element being projectable from the free end of said cap by fluid released by said poppet under the action of said yielding means upon a predetermined pressure drop within the container; and G. an annular collar slidably carried on said poppet stem and engaging the other, opposite end of said yielding means, said annular collar being constrained from movement out of said housing by said second shoulder and being movable in said housing toward said container by said compressing means to compress said yielding means when said cap is connected to said housing.

18. An indicator as recited in claim 7 in which said indicating element includes a resilient skirt seal including side walls resiliently engaging the interior walls of said cap and defining a cupped surface facing toward the container against which the fluid released by said poppet acts to project said element from the free end of said cap.

* * * * *